United States Patent Office 3,234,039
Patented Feb. 8, 1966

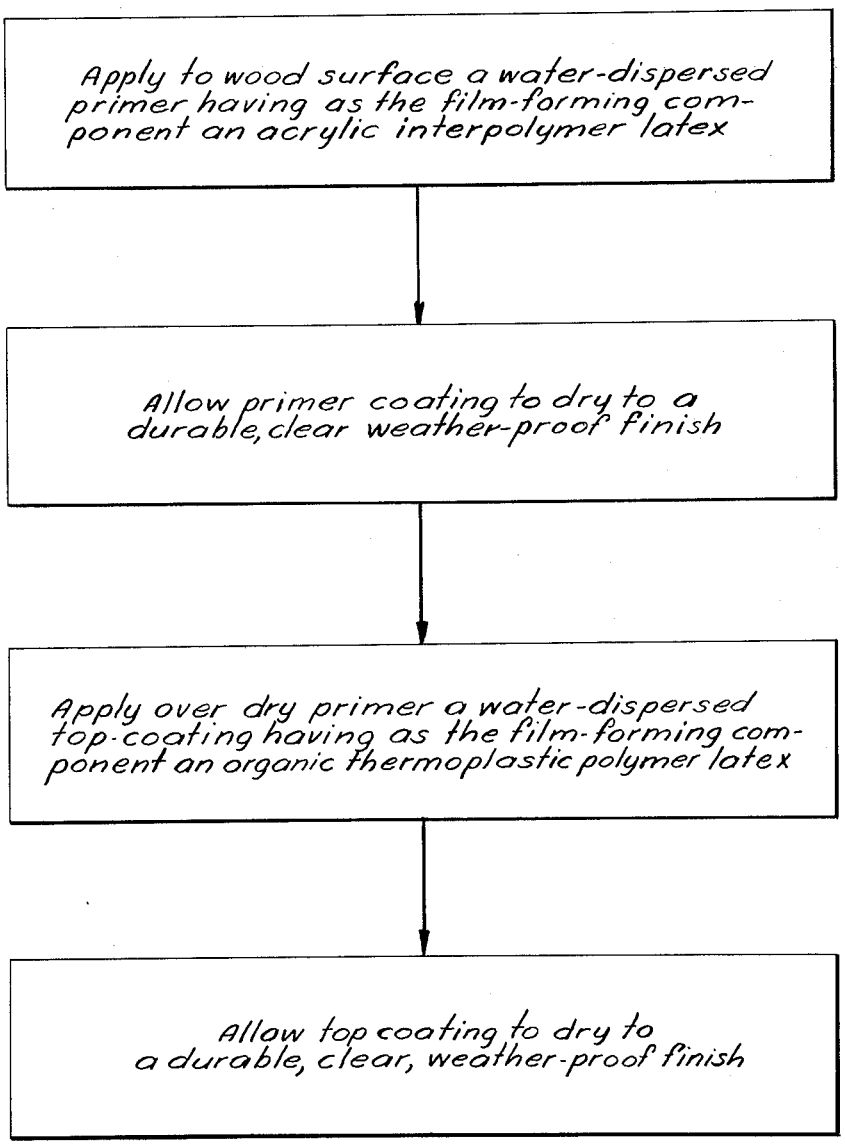

3,234,039
TRANSPARENT LATEX FINISH SYSTEM FOR EXTERIOR WOOD
Robert Henry Lalk, Norman Richard Peterson, and Donald Kubisiak, Midland, and Christian Albert Weber, Sanford, Mich., assignors to The Dow Chemical Company, Midland, Mich., a corporation of Delaware
Filed Jan. 16, 1961, Ser. No. 82,719
12 Claims. (Cl. 117—72)

The invention relates to clear, transparent, latex finishing systems and a method of applying the same to protect the exposed surfaces of unfinished woods and previously coated woods employed in various exterior construction assemblies. More particularly, the present invention provides clear, transparent, latex finishing systems comprising a clear, adhering undercoating composition or primer and durable, transparent topcoating compositions.

Various latex formulations have been tried in attempts to provide clear, protective finishes for wood employed in exterior construction assemblies. In the majority of cases, these formulations have been dissatisfactory. Many of the known clear, latex coatings, when subjected to exposure of varying weather conditions have failed rapidly. After relatively short periods of exposure to the elements of nature, the currently available clear latex coatings have cracked, chipped, peeled and, in general, shown signs of adhesion loss.

Such dissatisfactory performance of past latex finishes has been primarily due, in many instances, to the lack of adequate adhesion of the primer coat to the surface coating already present on the wooden substrate. Likewise, dissatisfaction has resulted due to the lack of adhesion of dried latex coatings to unfinished wooden substrates upon which the latex coating was applied for the first time. Thus far, optimum film properties required for satisfactory performance of topcoating materials have been shown to fall short of the optimum properties necessary in a primer coating material.

In addition, varnish systems now commonly employed as primer coatings for exterior wood surfaces have a number of disadvantages. The varnish systems tend to badly discolor. This, of course, masks the natural beauty of the wood surfaces on which they are applied. Also, the varnishes lack durability and stability when weathered, as is strikingly evidenced by the early cracking, chipping, and peeling type of coating erosion.

It is the principal object of the present invention to provide an effective method for protecting, and thus preserving, the substrates of various types of previously coated wood and unfinished woods employed in exterior construction assemblies by providing clear, transparent latex finishing systems.

Another object of the present invention is to provide clear, transparent latex finishing systems comprising an adhering undercoating composition or primer and a variety of durable topcoating compositions, each of which dries to a clear, transparent finish.

A further object of the present invention is to provide a primer coat which, when dry, adheres tenaciously and protectively to the surfaces of either unfinished or previously finished wood and which simultaneously acts as a suitably adhesive base coat to adequately hold and support the topcoat.

Another noteworthy object of the present invention is to provide a wood primer containing a rapid film-forming latex which resists staining by sealing in the water-soluble substances normally present in wood that previously tended to bleed through and discolor firstly the dried primer coating and then the dried topcoating.

A further outstanding object of the present invention is to provide transparent latex exterior wood finish systems that do not darken nor mask the naturally attractive color and grain of the virgin wood surfaces upon which they are applied.

A further beneficial object of the instant invention is to provide clear, transparent, latex finishing systems for wood that not only protect the wood surface against weathering but have sufficient elasticity to adjust to dimensional changes, such as normal contraction of the wood due to aging, as well as frequently reoccurring dimensional changes caused by sudden changes in weather conditions.

Another advantageous object to the present invention is to provide durable, clear, latex finishing systems that effectively protect wood surfaces against the degradative effects of ultraviolet light (sunlight) and moisture.

An additional object of the present invention is to provide outdoor wooden assemblies with a transparent finish which, when dry, is most pleasing to the aesthetic sense.

An additionally beneficial object of the present invention is to provide clear, latex finishes for exterior wooden structures which will provide an easily refinishable surface even after prolonged exposure to variable weathering conditions.

A concluding utilitarian object of the present invention is to provide a superior latex primer composition and excellent latex topcoating compositions which, when wet, have a milky appearance on the wood surface and consequently allow the professional or amateur painter sufficient time to easily distinguish the extent of coating coverage of the wood, and yet, when dry, the same coatings become completely transparent.

These and other beneficial objects are provided by means of the transparent, latex finishing systems of the present invention and the method for applying the same in order to protectively coat and preserve the weathered surfaces of previously coated woods and fresh unfinished woods in a variety of exterior construction assemblies, which method comprises the steps of: (I) applying to a wooden substrate a liquid latex primer coating comprising an aqueous acrylic interpolymer latex which may optionally contain small amounts of a thickening compound, an antifoaming agent, a film preservative, a pigment extender, and a drying oil; (II) air-drying said primer coating; (III) applying a topcoat over the dried primer, which topcoat comprises an air-dryable, film-forming organic thermoplastic polymer latex; and (IV) allowing said topcoat to airdry to a durable, clear, weather-proof finish.

The aqueous latexes employed so advantageously as the film-forming components of the clear, exterior wood primer coating materials of the present invention are selected from the group of aqueous acrylic interpolymer latexes comprising an aqueous dispersion of water-insoluble interpolymers composed of (A) about 60 to about 80 percent by weight of at least one polymerizable acrylic ester which by itself forms soft polymers and which is selected from the group consisting of esters of acrylic acid and primary alkanols of between 1 and 18 carbon atoms; of (B) about 38 to about 18 percent by weight of at least one polymerizable monovinylidene compound which by itself forms a hard polymer and which is selected from the group consisting of alkyl methacrylates in which the alkyl group has from 1 to 4 carbon atoms, tert.-amyl acrylate, tert.-butyl methacrylate, tert.-amyl methacrylate, tert.-butyl acrylate, cyclohexyl acrylate, cyclohexyl methacrylate, and acrylonitrile; and of (C) about 0.5 to about 2.0 percent by weight of at least one polymerized $\alpha,\beta$-unsaturated carboxylic acid; said aqueous latex dispersion containing a water-soluble emulsifying agent and a post-stabilizing agent.

Other resinous materials in dispersed form, such as alkyd resins, drying oils, or latices of styrene, styrene and butadiene and vinyl acetate may be blended with the above indicated aqueous latices to extend the same.

Copolymerization of the various suggested monomers to produce the interpolymer latices employed as the binding ingredient in the latex primer and topcoating materials of the clear, latex finishing systems of the present invention may be commonly effected below about 80° C. although somewhat higher temperatures are permissible. After most of the monomers have been converted to the interpolymer, temperatures even higher than 80° C. may then be applied. During interpolymerization, the temperature can be controlled in part by the rate at which monomers are supplied and interpolymerized and/or by applied cooling.

The polymerization process may be performed batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. An advantage of gradual monomer addition lies in reaching a high solids content with optimum control and with maximum uniformity of product. Additional catalyst or additional components of the redox system, described hereinafter, may also be added as polymerization proceeds.

As polymerization catalyst there may be used one or more peroxides which are known to act as free radical catalysts and which have solubility in aqueous solutions of the emulsifier. Usually convenient are the persulfates, including ammonium, sodium and potassium persulfates or hydrogen peroxide or the perborates or percarbonates. There may also be used organic peroxides either alone or in addition to an inorganic peroxide compound. Typical organic peroxides include benzoyl peroxide, tert.-butyl hydroperoxide, cumene peroxide, acetyl peroxide, caproyl peroxide, tert.-butyl perbenzoate, tert.-butyl diperphthalate, methyl ethyl ketone peroxide and the like. Choice of inorganic or organic peroxide catalyst depends in part upon the particular combination of monomers to be interpolymerized, some of the monomers responding better to one type of catalyst than the other. The usual amount of catalyst required is roughly from about 0.01 percent to about 3.0 percent by weight as based on the weight of the monomer mixture.

In order to effect interpolymerization at a temperature below that at which coagulation of the latex might occur, it is desirable to activate the catalyst. The activation may best be accomplished by using a redox system in which a reducing agent within the limits of about 0.05 percent to about 6.0 percent as based on the weight of the mixture of monomers is present in addition to the peroxide catalyst. Many examples of such redox systems are known. Agents such as hydrazine or a soluble sulfite, including the alkali metal salts of hydrosulfites, sulfoxalates, thiosulfates, sulfites and bisulfites and the like can be employed. Redox systems may be activated by the presence of a small amount (a few parts per million) of polyvalent metal ions. Ferrous ions are commonly and effectively used, or a tertiary amine which is soluble in the reaction medium may also be used as an activator.

Also in accordance with current practices in the preparation of interpolymer latices, emulsifiers may be required to disperse or emulsify the present combination of monomers and to maintain the formed interpolymers in stable suspensions. The amounts of emulsifiers required vary primarily with the concentration of monomers to be handled and to a minor extent with the choice of emulsifier, monomers, and proportions of monomer. Generally the amount of emulsifying agent is between about 2.0 percent and about 12 percent of the weight of the mixture of monomers. Typical emulsifying agents which may be used include alkylphenoxypolyethoxyethanols having alkyl groups of about 7 to about 12 carbon atoms, polyethoxyethanol derivatives of methylene linked alkyl phenols, condensation products of ethylene oxide with higher alkylmercaptans having alkyl groups over about 9 carbon atoms, condensation products of ethylene oxide with alkylthiophenols having alkyl groups of about 6 to about 15 carbon atoms, alkali metal salts of alkylbenzene-, alkyltoluene-, sulfonic acids (and alkyl aryl polyether sulfonates), having aliphatic side chains of about 10 to about 15 carbon atoms, and the like.

In the process of polymerization for preparing the interpolymer latices applicable in the clear primer coating and topcoatings of the present invention, an aqueous emulsion of a mixture of the defined polymerizable monomers is stirred and treated with a redox catalytic system starting between about 10° C. and about 40° C. When interpolymerization starts, the temperature of the mixture rises, usually rather rapidly. Care must be taken to keep the temperature of the mixture below the levels at which coagulation might occur.

Amounts of monomers are added to bring the content of dispersed interpolymer to from about 25 percent to about 60 percent of the total dispersion, preferably to from about 45 percent to about 55 percent. Interpolymerization should be carried on until no more than a few percent of monomers remain in the mixture. Volatile residual monomers can be reduced or removed by steam distillation or stripped off under reduced pressure, if so desired.

With the attainment of the desired interpolymer content in good yield, with or without removal of residual monomers, the dispersion is cooled to a temperature within the range of about 50° C. to about 20° C. The dispersion is then rendered mildly alkaline by adding ammonia or a water-soluble amine, or an inorganic base, such as potassium or ammonium hydroxide, or a mixture thereof. Ammonium hydroxide, usually giving the best results in the simplest way, is preferred.

The aqueous acrylic interpolymer latex employed so advantageously as the clear, exterior wood primer of the present invention is exemplified by a quaternary interpolymer latex containing approximately 66 percent by weight of ethyl acrylate, about 32 percent by weight of methyl methacrylate, about 1.0 percent by weight each of acrylic acid and methacrylic acid, and about 0.9 percent by weight, as based on 100 parts by weight of the acrylic monomer components, of an emulsifying agent, obtained as "Triton X–200," a sodium salt of an alkyl aryl polyether sulfonate.

An aqueous dispersion of the above quaternary interpolymer as such, containing between about 45 and about 55 weight percent latex solids, having a specific gravity of 1.07 to 1.08 and having a No. 4 Ford Cup viscosity value of from 13 to 14 seconds under normal atmospheric conditions, may be advantageously employed per se as the unformulated primer coat and as an unformulated topcoat in one type of transparent latex finishing system of the instant invention. Of additional merit, the same latex dispersion may be comingled with small amounts of thickening agents, antifoaming agents, film preservatives, pigment extenders, etc. in the preparation of a preferred primer formulation. The same prime formulation having a non-volatile solids content between about 45 percent and 60 percent by weight may be used as a complementary topcoating. To this instant formulated acrylic latex coating composition (capable of being employed as primer and topcoating) may also be added as a post-stabilizing agent sufficient ammonium hydroxide to adjust the pH of the latex to from about 8.5 to 9.0. Approximately 2.0 parts per 100 parts of latex solids of a wetting agent such as a polyethoxy ethanol may also be added to increase the mechanical stability and the shelf life.

In further illustration of specific latexes which may be adapted to be employed as a topcoating per se or as the principal film-forming ingredient in the instant latex topcoat formulations, there may be mentioned several other transparent, latex exterior wood surface coatings of comparable properties and characteristics to the aforementioned quaternary interpolymer latex. For example, an aqueous terpolymer latex, containing about 60 percent by weight of butyl acrylate, about 37 percent by weight of acrylonitrile, and about 4 percent by weight of methacrylic acid, the terpolymer latex being adjusted to a pH in the range of from 8.5 to about 9.0 with dilute aqueous ammonium hydroxide.

Also, an 85/15 weight percent blend of the aforedescribed aqueous quaternary interpolymer latex with a copolymer latex of styrene and butadiene may be employed. A copolymer latex containing about 60 weight percent of styrene and about 40 percent by weight of butadiene forms an effectively compatible latex blend.

Although the aqueous quaternary acrylic interpolymer latex composition and coating formulations, containing the same aqueous latex compositions (as the principal film-forming ingredient) are entirely satisfactory as the primer and as a topcoating material employed so advantageously as clear latex exterior wood finishing systems of the present invention, there are a number of other commercially available aqueous latex compositions falling within the scope of top-coating materials applicable in the instant invention.

Illustrative of these commercially available aqueous latex compositions falling within the scope of the instant invention may be mentioned a copolymer latex containing about 71 percent by weight of ethyl acrylate and about 29 percent by weight of methyl methacrylate; a quaternary interpolymer latex containing about 50 percent by weight of styrene, about 40 percent by weight of 2-ethylhexyl acrylate, about 7.0 percent by weight of acrylonitrile, and about 3.0 percent by weight of acrylic acid; an interpolymer latex containing about 85 percent by weight of vinyl acetate, about 13 percent by weight of dibutyl maleate, and about 2.0 percent by weight of vinyl alcohol; and a terpolymer latex containing about 32 percent by weight of butyl acrylate, about 67.5 percent by weight of vinyl acetate and about 0.5 percent by weight of acrylic acid.

These commercially available latex coating compositions benefit by increased durability and adhesion as well as supply a more serviceable protection for exterior wood surfaces when these latex compositions are applied over the clear, latex primer of the present invention.

For best spreading and coating results, latex primer coatings and topcoating formulations having the most satisfactory application properties should ordinarily have a viscosity in the range of from about 70 to about 80 Krebs units under normal atmospheric conditions.

For most coating end uses, the addition of a thickening agent to the latex composition may be desired to attain optimum rheological properties. Commonly used thickening agents have been evaluated for their thickening efficiency and compatibility with the latexes employed in the clear, finishing formulations of the present invention. Of the materials tested, methyl cellulose, methyl hydroxypropyl cellulose, an ammonium polyacrylate solution obtained as "Acrysol G–110" and casein give very good results and may be employed in the instant formulations.

The water-soluble, cellulose ethers impart generally superior application properties to the composition, and scrub resistance to the dried coating. In addition, because they are non-nutrients, they are resistant to mildew and similar fungicidal attack. Water-soluble, cellulose ethers are commonly sold by viscosity grade. It is usually desirable to use the higher viscosity grades, as for example, 4000 centipoises.

Other protective colloids of like nature also perform efficiently and may be employed in the claimed formulations.

The use of antifoaming agents in the formulating processes of the latex coatings of the present invention are frequently desired. Exemplary of the useful antifoamers may be mentioned an anionic surface-active blend of processed, high melting, sulphated, saturated fats containing about 60 percent solids obtained as "Nopco 1497V," and an ester type material of cocoanut fatty acids obtained as "Defoamer ED" and the like. Another antifoaming agent of particular value in the preparation of the instant coating is polypropylene glycol, obtained as "Polyglycol P–1200," having an average molecular weight of 1200, a specific gravity at 25/25° C. of 1.003, and a refractive index at 25° C. of 1.449. This type of polypropylene glycol advantageously may be used to inhibit formation of foam in the pigment grinding stage of the process for formulating the clear, latex coatings of the present invention.

Although the latex compositions used in the clear, exterior wood finishes of the present invention are generally free from bacterial contamination, when freshly prepared, bulk storage of the latex compositions may give opportunity for outside contaminants to be introduced. Also, during formulation of the latex coatings, ingredients such as certain thickeners, which are bacteria nutrients, may be incorporated and may necessitate addition of a preservative.

Such commonly used latex preservatives as sodium-O-phenylphenol tetrahydrate, obtained as "Dowicide A," sodium pentachlorophenol monohydrate, obtained as "Dowicide G," phenyl mercuric acetate, and di(phenyl mercury) dodecenyl succinate obtained as "Super Ad-It" have been employed satisfactorily. As will be appreciated by the skilled worker, the type and level of any particular preservative will depend on the particular formulation, the storage conditions, and other deciding factors.

Most of the extender pigments in common use in clear, coating formulations are suitable for the present purpose. These pigments include clay, calcium carbonate, barytes and talc. All are useful in appropriately small particle sizes. And particularly applicable is waterground mica of about a 325 mesh particle size as specified by the U.S. Standard Sieve Series.

Pigment dispersants in small amounts are ordinarily used in most clear coating formulations and are helpful in the formulation of some of the coatings of the present invention. Certain dispersing agents or a system of dispersants such as the sodium salt of a carboxylated polyelectrolyte, obtained as "Tamol 731", potassium tripolyphosphate, and a combination of "Tamol 731" and a ditertiary acetylenic filycol obtained as "Surfynol 104" are efficient dispersants suited to the instant use. Other common dispersants may be employed which would provide equivalent performance.

Among the drying oils that optionally may be employed in the preparation of the outstandingly superior clear (when dry) latex undercoat or primer coat of the present invention are dehydrated castor oil, tung oil, china wood oil, safflower oil, long oil linseed alkyd, long oil soybean alkyd, raw linseed oil, and particularly boiled linseed oil. However, other types of oils wherein the polymer is insoluble but compatible therewith and which are compatible with the formulated latex coatings and which migrate out of the coalesed latex film may be used. For best results, from about 5 to about 25 percent and preferably from about 5 to about 10 percent of a drying oil based on the total wet weight of the formulated latex primer may be used.

To increase the effectiveness of the latex primer of the present invention, the drying oil may be added to the formulated latex primer by easily and simply admixing or stirring into the latex formulation by hand-paddle mixing or mechanical stirring the indicated amount of a drying oil. The drying oil normally remains suspended for several hours in the latex formulation without requiring further agitation to provide an excellent latex primer composition.

The addition of a drying oil to the primer coat is particularly advantageous in refinishing operations over oil-base painted wood surfaces. The oil in the primer effectively penetrates the weathered surface layer of paint causing an excellent adhesive seal between the weathered surface coating and the freshly dried latex primer coat.

Each type of primer coating of the present invention, either the aqueous latex dispersion, the aqueous latex formulation, or the oil-containing aqueous latex formulation, may be easily applied by various methods such as brushing, spraying, or rolling onto previously coated wood substrates or the uncoated exterior wood surfaces, whereupon the latex primer dries rapidly to a clear, adherent and coherent film. It is believed that due to the natural ease and rapidity with which the latex particles of the primer coalesce to form a film forces a considerable portion of the insoluble drying oil, if it has been included, to migrate out of the film and into the wood substrate or the chalk coated wood surface beneath the primer coating. Subsequent curing of the oil by air-drying under normal, outdoor weather conditions causes the formation of an excellent, adhesive, protective bond between the latex film and the previously coated or uncoated wood surfaces.

To obtain maximum protection of all types of wood, old or new, coated or uncoated, employed in outdoor construction assemblies, a topcoat or final coat of any of the aqueous latex coatings and aqueous latex formulations of the present invention or the commercially available types, as previously described, provide optimum durability to the clear, latex finishing systems of the present invention. The top-coating may be applied by any of the conventional means previously recommended for application of the aforementioned primer coat of the present invention. After air-drying of any of the clear latex topcoats (within the limits of the present invention) under normal, outdoor conditions, a transparent, durable, non-tacky, water-resistant finish is obtained. The combinations of coating materials which comprise the clear latex finish systems of the instant invention show excellent resistance against the deteriorating effects of weathering, as ably demonstrated by outdoor panel exposure tests under normal, seasonal variations of weather.

In order that those skilled in the art may better understand the invention, the following examples are given by way of illustration and not by way of limitation. All parts are by weight unless otherwise designated.

EXAMPLE I

| Ingredients: | Lbs. per 100 gals. |
|---|---|
| Pigment grind, Cowles dissolver—Water solvent) | 70 |
| "Tamol 731" (25% solids) (pigment dispersant) | 2.3 |
| Mica, 325 mesh, w./g. (extender pigment) | 100.0 |
| "Methocel 65 HG", 4000/cps. (2.5% solids) (a protective colloid) | 100.0 |
| "Polyglycol P-1200" (pigment dispersant and a pigment aqueous dispersion defoamer) | 1.7 |
| Let down— | |
| Latex aqueous dispersion (66% ethyl acrylate, 32% methacrylate, and 1.0% each of acrylic and methacrylic acids by weight 47% solids) | 781.0 |
| "Super Ad-It" (mildewicide) | 6.0 |
| "Nopco 1497V/$H_2O$" (1:1) (defoamer) | 10.0 |
| "Acrysol G-110" (22% solids) (thickener) | 2.0 |
| | 1073.0 |
| Pigment volume concentration (percent) | 10.0 |
| Non-volatile content (percent) | 45.0 |
| pH (adjust with $NH_4OH$ to) | 8.5–9.0 |
| Viscosity (Krebs units) | 70.0±2 |

There were mixed and ground on a Cowles Dissolver about 2.3 lbs. of the pigment dispersant "Tamol 731," about 100 lbs. of the extender pigment, Mica, about 100 lbs. of a protective colloid, "Methocel 65 HG," about 1.7 lbs. of a combined pigment dispersant and a pigment aqueous dispersion defoamer, "Polyglycol P-1200" and about 70 lbs. of water. When this mixture has been ground to a smooth, uniform paste, it is mixed with about 781 lbs. of the indicated dispersion of interpolymer, which contained about 47 percent solids, about 6 lbs. of a mildewicide, "Super Ad-It;" about 10 lbs. of a defoaming agent, "Nopco 1497V/$H_2O$ (1.1);" and about 2 lbs. of a thickening agent, "Acrysol G-110." When these weights are used, this formula yields about 100 gallons of a latex coating material. The approximate total weight of the 100 gallons of coating was 1073 lbs. It contained about 45.0 percent by weight of non-volatile solids, had a viscosity measured in Krebs units of 70±2, had a pH in the range of between about 8.5 and 9.0, and had a pigment volume concentration of about 10 percent.

EXAMPLE II

In specific methods for finishing previously uncoated exterior wood substrates in accordance with the present invention, individual samples of the clear quaternary interpolymer latex formulation of Example I were given a variety of independent treatments and were applied and tested for adhesive qualities following outdoor exposure.

Several samples of the quaternary acrylic interpolymer latex formulation of Example I, described above, were modified with varying amounts of boiled linseed oil, raw linseed oil, soybean oil, dehydrated castor oil, tung oil, safflower oil, linseed long oil alkyd, and soya bean long oil alkyd. The oils were added with stirring to separate samples at a level of from about 5 to 20 percent by weight as based on the wet weight of the latex formulation.

Thereafter, various combinations of the oil-modified and unmodified quaternary acrylic interpolymer latex formulation were applied as primer coatings and top-coatings by brushing the same onto panels of previously uncoated redwood siding. Each acrylic latex primer coating was allowed to airdry overnight before one of a varied selection of latex topcoating materials was brushed on.

It was observed in all cases that the redwood substrate did not bleed water-soluble substances through the air-dried, transparent, acrylic latex primer coating of the present invention. Of comparable merit, the air-dried, transparent quaternary acrylic interpolymer latex, when applied as a topcoating, in each instance formed a non-tacky, water-resistant coating.

In order to have some generally accepted basis of comparison of the results produced by the outdoor exposure tests conducted, redwood siding panels were primed and topcoated with Spar varnish in the same manner as the latex coatings of the present invention. The results of exposure tests of Spar varnish coated panels acted as the controls.

Test panels were set out to receive 45 degree both vertical north (VN) and vertical south (VS) exposures to the weather of rural Midland, Michigan for two years. The superior resistance of the latex coating combinations of the present invention after two years exposure to the deteriorating effects of normal, changeable weather is effectively shown in Table I, which follows.

In Table I, the quaternary acrylic interpolymer latex formulation of Example I is designated in the table captions as "Primer." "Oil" in the captions signifies the oil or alkyd modifier indicated in the last column at the right of the table. Note, also, the extent of failure of each coating system was determined by observing the percentage of the coated surface of each test panel that had cracked, chipped, peeled or flaked due to loss of adhesion.

acrylonitrile, and about 4.0 percent by weight of methacrylic acid;

A terpolymer latex containing about 32 percent by weight of butyl acrylate, about 67.5 percent by weight of vinyl acetate, and about 0.5 percent by weight of acrylic acid;

and an 85 percent by weight blend of the aqueous quaternary acrylic interpolymer latex employed in Example I with the remainder of the blend being composed of a 60/40 weight percent copolymer latex of styrene and butadiene.

For purposes of comparison, a second series of redwood and cedar uncoated new wood control test panels were brush coated with two coats of the latex coatings which were employed as topcoatings immediately above.

The observed results of both series of finished test panels which were exposed to direct weathering in Midland, Michigan for 30 months are recorded in Table II

*Table I*

| Panel | Exposure | Spur Varnish Controls | | 2 Coats "Primer" | 1 Coat "Primer"+ "Oil"+1 Coat "Primer" | 2 Coats "Primer"+ "Oil" | Oil or Alkyd Modifier |
|---|---|---|---|---|---|---|---|
| | | A | B | | | | |
| 1 | VS | 50% failure | | 5% failure | 2% failure | No failure | 5% Boiled Linseed Oil. |
| | VN | | No failure | No failure | do | do | |
| 2 | VS | 60% failure | | 10% failure | No failure | do | 10% Boiled Linseed Oil. |
| | VN | | No failure | No failure | do | do | |
| 3 | VS | 50% failure | | 10% failure | do | do | 20% Boiled Linseed Oil. |
| | VN | | No failure | No failure | do | do | |
| 4 | VS | 10% failure | | do | do | do | 10% Raw Linseed Oil. |
| | VN | | No failure | do | do | do | |
| 5 | VS | 25% failure | | 5% failure | do | do | 10% Soya Oil. |
| | VN | | No failure | No failure | do | do | |
| 6 | VS | 5% failure | | do | do | do | 10% Dehydrated Castor Oil. |
| | VN | | No failure | do | do | do | |
| 7 | VS | | 2% failure | do | do | do | 10% Tung Oil. |
| | VN | 10% failure | | do | do | do | |
| 8 | VS | | No failure | do | do | do | 10% Safflower Oil. |
| | VN | 10% failure | | do | do | do | |
| 9 | VS | | 5% failure | do | do | do | 10% Linseed, Long Oil Alkyd. |
| | VN | 10% failure | | do | do | do | |
| 10 | VS | | No failure | do | do | do | 10% Soya Long Oil alkyd. |
| | VN | 20% failure | | do | do | do | |

EXAMPLE III

A series of redwood and cedar uncoated new wood test panels were brush coated employing the latex primer coat of Example I without the drying oil additive. After the acrylic latex primer coat had dried overnight to a clear finish, one panel of each type of wood was topcoated with one coat of each of the following latex coatings:

A copolymer latex containing about 71 percent by weight of ethyl acrylate with about 29 percent by weight of methyl methacrylate;

An interpolymer latex containing about 50 percent by weight of styrene, about 40 percent by weight of 2-ethyl hexyl acrylate, about 7 percent by weight of acrylonitrile, and about 3 percent by weight of acrylic acid;

A copolymer latex containing about 85 percent by weight of vinyl acetate, about 13 percent by weight of dibutyl maleate, and about 2 percent by weight of vinyl alcohol;

A terpolymer latex containing about 60 percent by weight of butyl acrylate, about 37 percent by weight of

*Table II*

CLEAR LATEX FINISH SYSTEMS ON REDWOOD SIDING 30 MONTHS V.S.[1] OUTDOOR EXPOSURE SERIES RURAL MIDLAND, MICHIGAN LOCATION

| Topcoat Latex System | Quaternary Interpolymer Latex Primer+Different Interpolymer Latex Topcoat | 2 Coats of Different Interpolymer Latex Topcoats with No Primer Coat |
|---|---|---|
| 85% Quaternary Acrylic Latex +15% Styrene/Butadiene Copolymer Latex. | No failure | 10% failure. |
| 71% Ethyl Acrylate/29% Methyl Methacrylate/Copolymer Latex. | do | 60% failure. |
| 50% Styrene/40% 2-Ethyl Hexyl Acrylate/7% Acrylonitrile/3% Acrylic Acid Interpolymer Latex. | 5% failure on edges. | 90% failure. |
| 85% Vinyl Acetate/13% Dibutyl Maleate/2% Vinyl Alcohol Copolymer Latex. | 10% failure on edges. | 95% failure. |
| 32% Butyl Acrylate/ 67.5% Vinyl Acetate/0.5% Acrylic Acid Terpolymer Latex. | No failure | 20% failure. |
| 60% Butyl Acrylate/37% Acrylonitrile/4% Methacrylic Acid Terpolymer Latex. | do | 15% failure. |

[1] Vertical South 45 degree exposure angle.

The extent of failure of each coating system was determined by observing the percentage of the coated surface of each test panel that had cracked, chipped, peeled or flaked due to loss of adhesion.

These exposures showed the outstanding weathering protection afforded by the clear, latex exterior wood finishing systems of the present invention in contrast to the double coatings of commercially available latex materials. The test panels of the latter showed severe erosion, peeling, and other evidences of weathering.

The clear, latex exterior wood finishing systems of the present invention have better adhesion and protection against water transmission through the coating due to the superior adhesion characteristics of the acrylic latex primer coat. In addition, the topcoating gives further durable protection against degradative effects of sunlight and surface weathering as compared to the double coats of commercial latex coatings on exterior woods.

Thus, all the aqueous film-forming, latex exterior wood finishing systems of the instant invention have excellent resistance to ultraviolet light and excellent adhesion to refinished surfaces as well as uncoated wood substrates. Of additional significance is the fact that the finishing systems disclosed in the instant invention retain their original adhesion to wood surfaces employed in outdoor constructional applications on prolonged exposure to sunlight and moisture for extended periods of time.

Of additional merit when subjected to the severe effects of prolonged exposure, the transparent, latex finishes of the present invention weather to an easily refinishable surface which does not require an excessive amount of sanding and scraping before being ready for further refinishing.

The formulated and unformulated latex materials which make up the primer and topcoatings of the present invention, when wet, have a slightly milky appearance which adds to the ease and effectiveness with which they may be applied both professionally and by amateur painters. In addition, the brushes, rollers, or spraying means used for applying the latex primers and topcoats of the present invention may be easily and completely cleaned after use by rinsing and simultaneously working out of the brushes, etc., the latex material while the brush is in contact with a stream or agitating quantity of clear, tap water.

Many widely different embodiments of this invention may be made without departing from the spirit and scope thereof. Therefore, it is not intended to be limited except in accordance with the appended claims.

What is claimed is:

1. Method of finishing of coated and uncoated wood substrates with a clear, transparent protective coating which comprises the steps of: (I) applying to a wooden substrate a liquid latex-based primer coating comprising from about 45 to about 55 weight percent of non-volatile polymer solids of a film-forming latex of an acrylic interpolymer composed of (A) from about 60 to about 80 percent by weight of the interpolymer of at least one interpolymerizable acrylic ester which by itself forms soft polymers and which is selected from a group consisting of esters of acrylic acid and primary alkanols of between 1 and 18 carbon atoms; of (B) from about 39 to about 18 percent by weight of the interpolymer of at least one interpolymerizable monovinylidene compound which by itself forms a hard polymer and which is selected from the group consisting of alkyl methacrylates in which the alkyl group contains from 1 to 4 carbon atoms, tert-amyl methacrylate, tert.-butyl methacrylate, tert.-amyl acrylate, tert.-butyl acrylate, cyclohexyl acrylate, cyclohexyl methacrylate, and acrylonitrile; and of (C) about 0.5 to about 2.0 percent by weight of the interpolymer of at least one interpolymerizable $\alpha,\beta$-unsaturated carboxylic acid; (II) air-drying said primer coating; (III) applying a topcoating composition over the dried primer, said topcoating composition being comprised of from about 45 to about 60 weight percent of non-volatile polymer solids of an air-dryable, film-forming, organic, thermoplastic polymer latex composed of an aqueous dispersion of more than one polymerizable ethylenically unsaturated monomer; and (IV) allowing said topcoating composition to air-dry to a durable, clear, weather-proof, finish.

2. The method of claim 1, wherein said liquid latex primer coating is an aqueous quaternary interpolymer latex dispersion composed of an interpolymer of about 66 percent by weight of ethyl acrylate, about 32 percent by weight of methyl methacrylate, and about 1.0 percent by weight of each of acrylic acid and methacrylic acid.

3. The method of claim 1, wherein said liquid latex primer coating is a primer coating formulation comprising essentially water, an extender pigment, a protective colloid, and an aqueous acrylic latex dispersion composed of an interpolymer of about 66 percent by weight of ethyl acrylate, about 32 percent by weight of methyl methacrylate, and about 1.0 percent by weight of each of acrylic acid and methacrylic acid.

4. The method of claim 3, wherein said primer coating formulation is modified by admixing into said formulation from about 5 to about 10 percent by weight as based on the total wet weight of said formulation of a water-insoluble drying oil compatible with the polymer of the latex and in which said polymer is insoluble.

5. The method of claim 4, wherein said drying-oil is selected from a group consisting of raw linseed oil, boiled linseed oil, dehydrated castor oil, tung oil, safflower oil, linseed long oil alkyd, and soya long oil alkyd.

6. The method of claim 1, wherein said air-dryable, film-flowing organic thermoplastic polymer latex topcoating is an aqueous acrylic quaternary interpolymer latex dispersion composed of an interpolymer of about 66 percent by weight of ethyl acrylate, about 32 percent by weight of methyl methacrylate, and about 1.0 percent by weight of each of acrylic acid and methacrylic acid.

7. The method of claim 1, wherein said air-dryable, film-forming, organic thermoplastic polymer latex topcoat is a coating formulation comprising essentially water, an extender pigment, a protective colloid, and an aqueous acrylic quaternary interpolymer latex dispersion composed of an interpolymer of about 66 percent by weight of ethyl acrylate, about 32 percent by weight of methyl methacrylate, and about 1.0 percent by weight of each of acrylic acid and methacrylic acid.

8. The method of claim 1, wherein said air-dryable film-forming organic thermoplastic polymer latex topcoat is a coating material composed of about 85 percent by weight of the aqueous acrylic quaternary interpolymer latex dispersion of claim 7 in combination with about 15 percent by weight of an aqueous styrene/butadiene copolymer latex, said copolymer latex being composed of about 60 weight percent of styrene and about 40 weight percent of butadiene.

9. The method of claim 1, wherein said air-dryable, film-forming organic thermoplastic polymer latex topcoat is an aqueous copolymer latex comprised of a copolymer composed of about 71 percent by weight of ethyl acrylate and about 29 percent by weight of methyl methacrylate.

10. The method of claim 1, wherein said air-dryable, film-forming organic thermoplastic polymer latex topcoat is an aqueous interpolymer latex composed of a copolymer composed of about 85 percent by weight of vinyl acetate, about 13 percent by weight of dibutyl maleate, and about 2.0 percent by weight of vinyl alcohol.

11. The method of claim 1, wherein said air-dryable, film-forming, organic, thermoplastic, polymer latex topcoat is an aqueous terpolymer latex comprised of a copolymer composed of about 32 percent by weight of butyl acrylate, about 67.5 percent by weight of vinyl acetate and about 0.5 percent by weight of acrylic acid.

12. The method of claim 1, wherein said air-dryable, film-forming, organic, thermoplastic, polymer latex topcoat is an aqueous interpolymer latex comrised of a copolymer composed of about 60 percent by weight of butyl acrylate, about 37 percent by weight of acrylonitrile, and about 4.0 percent by weight of methacrylic acid.

References Cited by the Examiner

UNITED STATES PATENTS

| | | | |
|---|---|---|---|
| 2,760,886 | 8/1956 | Prentiss et al. | 117—72 |
| 2,889,236 | 6/1959 | Hahn | 117—72 |
| 2,955,054 | 10/1960 | Parker et al. | 117—72 |
| 2,958,611 | 11/1960 | Ulrich | 117—148 XR |
| 3,037,881 | 6/1962 | McDowell | 117—148 XR |

FOREIGN PATENTS

| | | |
|---|---|---|
| 209,779 | 12/1955 | Australia. |
| 749,801 | 5/1956 | Great Britain. |

JOSEPH B. SPENCER, *Primary Examiner.*

RICHARD D. NEVIUS, *Examiner.*